Feb. 29, 1944.  R. ANSCHÜTZ ET AL  2,342,782
CALCULATING MACHINE
Filed July 13, 1938  11 Sheets-Sheet 1

Inventors,
R. Anschütz
& R. Gröschel

By: Glascock Downing & Seebold
Attys.

R. Anschütz
R. Gröschel
Inventors

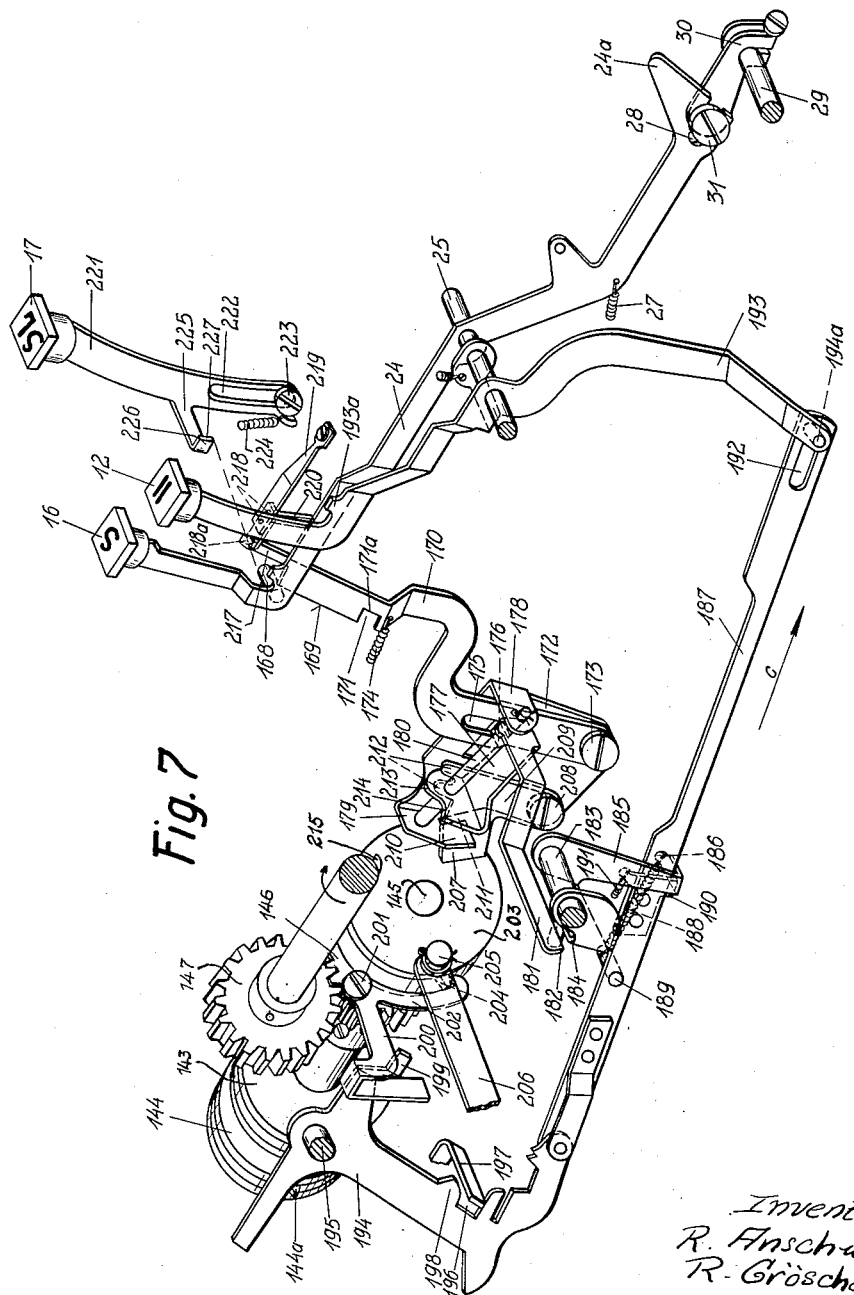

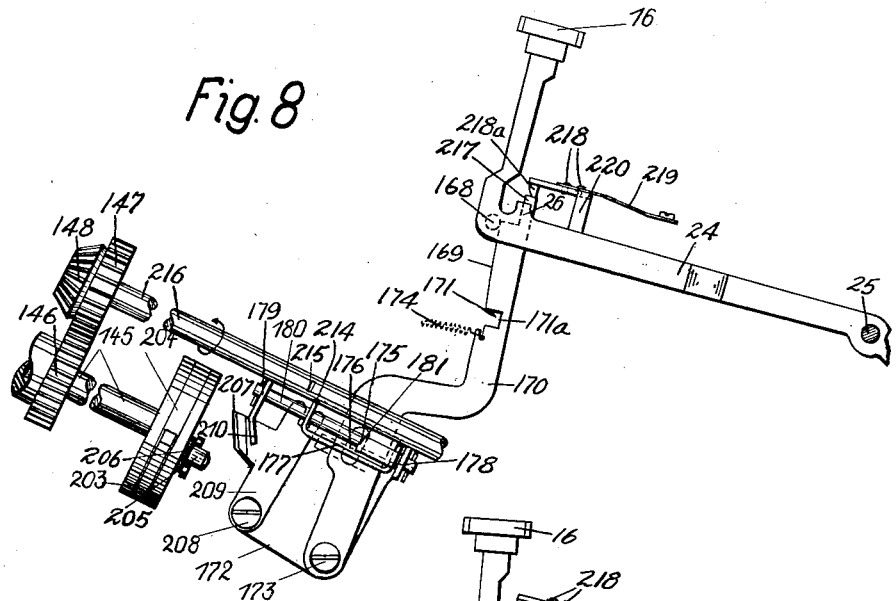
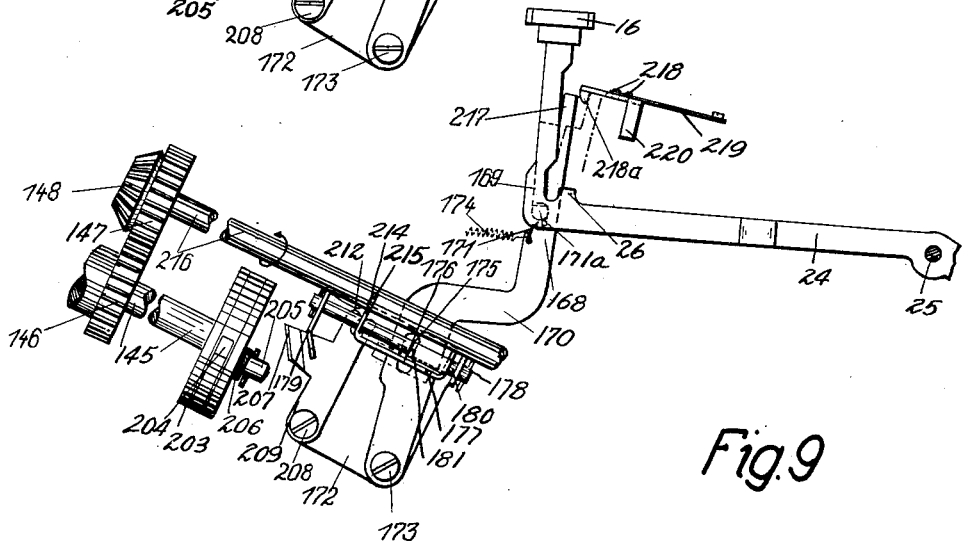

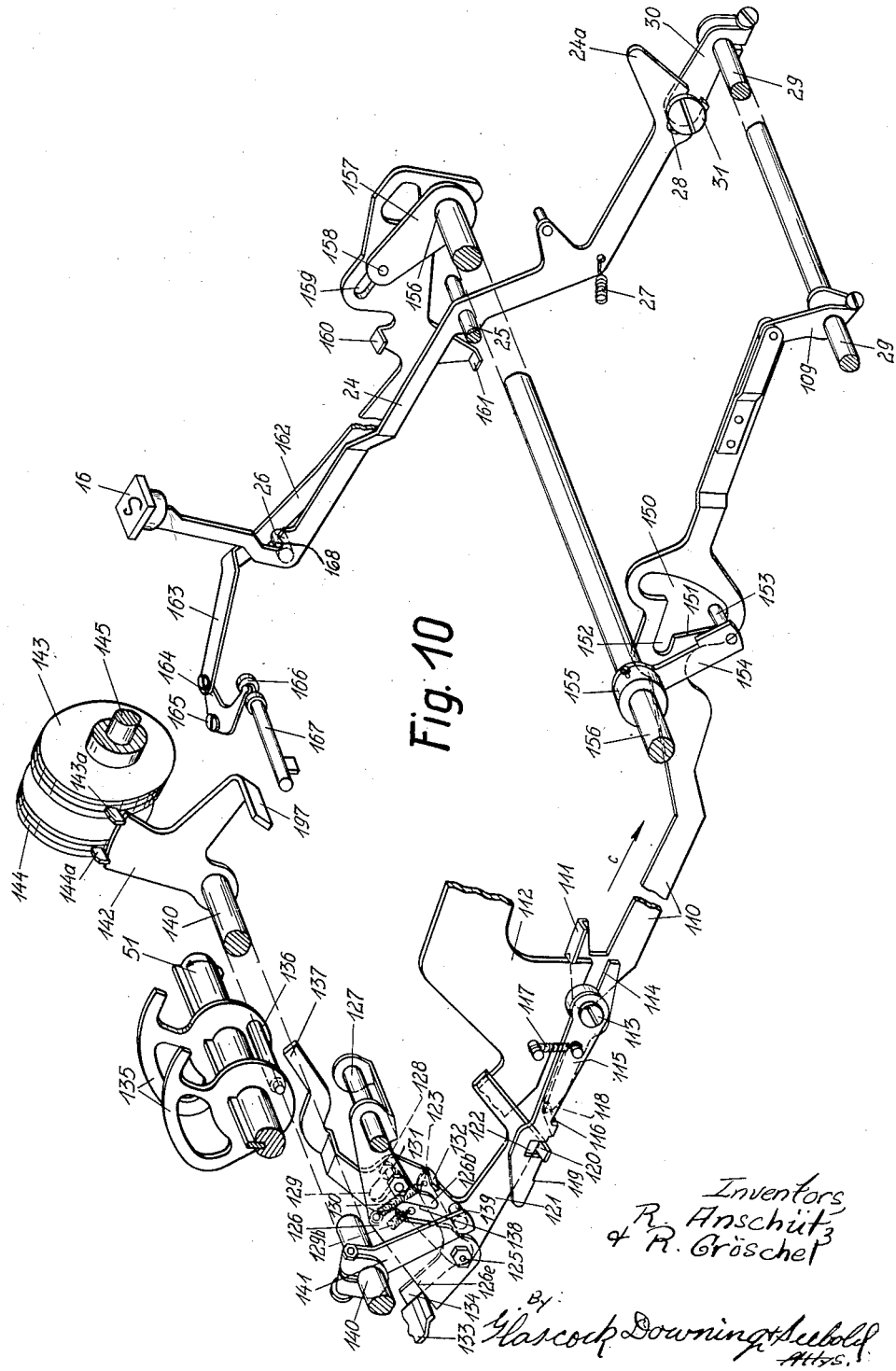

Feb. 29, 1944.   R. ANSCHÜTZ ET AL   2,342,782
CALCULATING MACHINE
Filed July 13, 1938   11 Sheets-Sheet 7
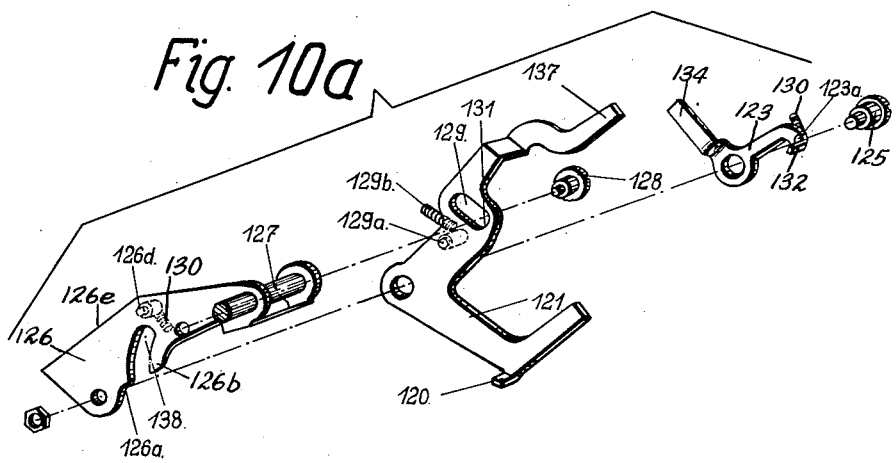
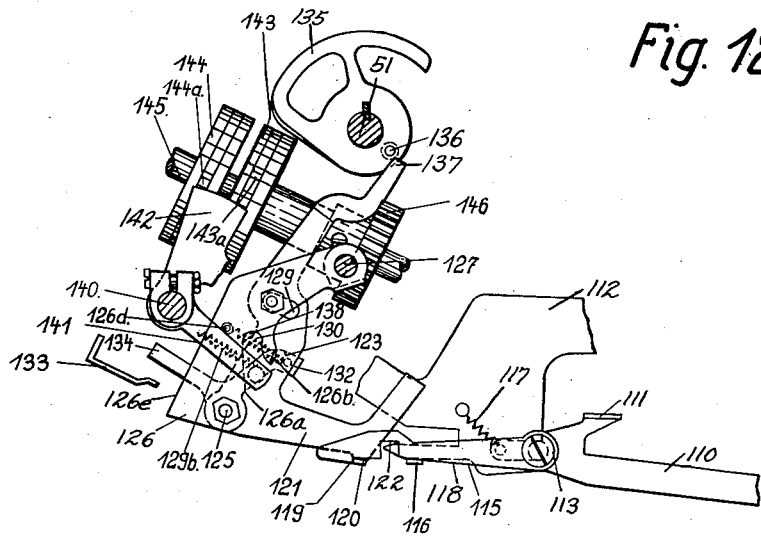

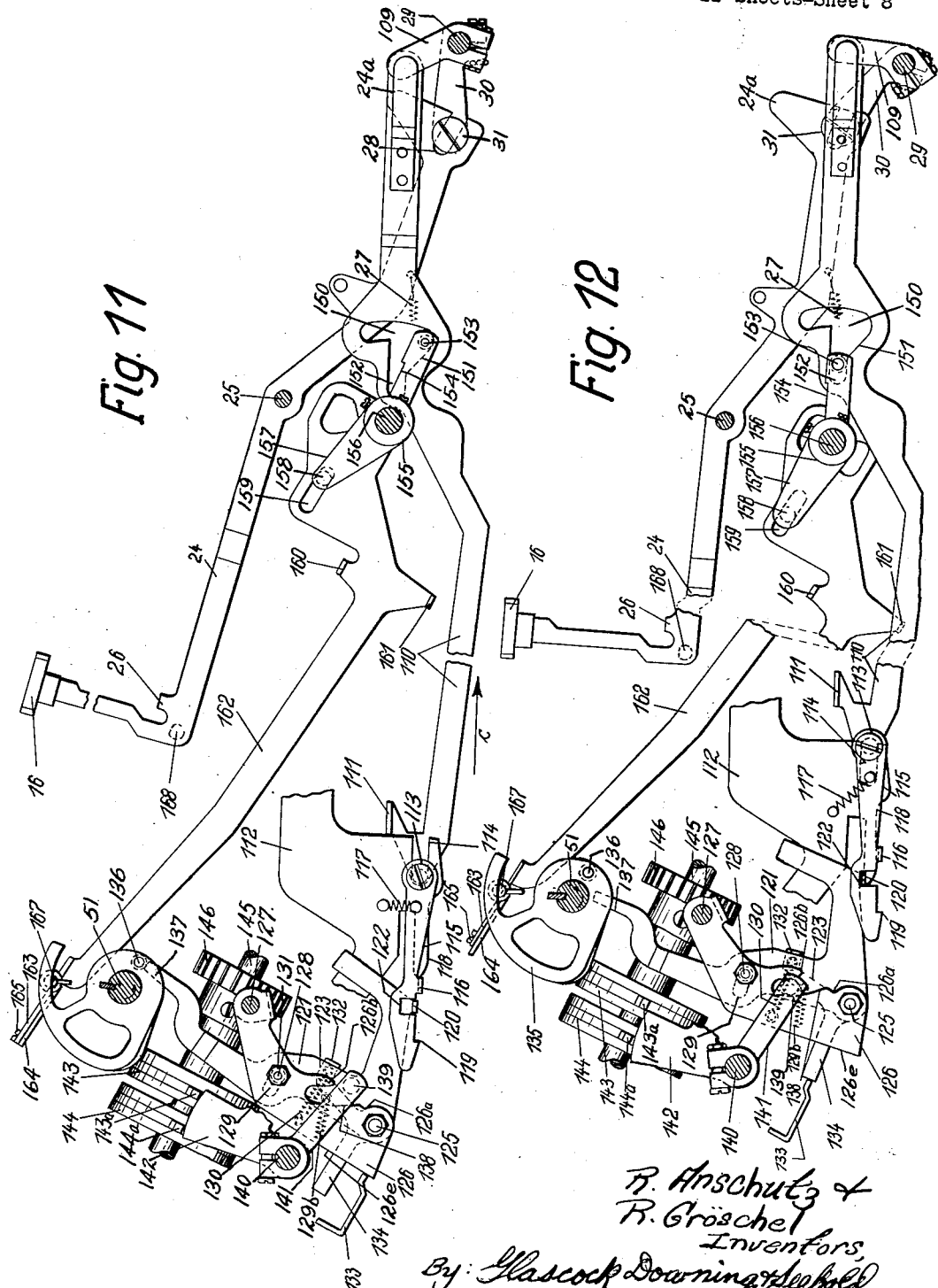

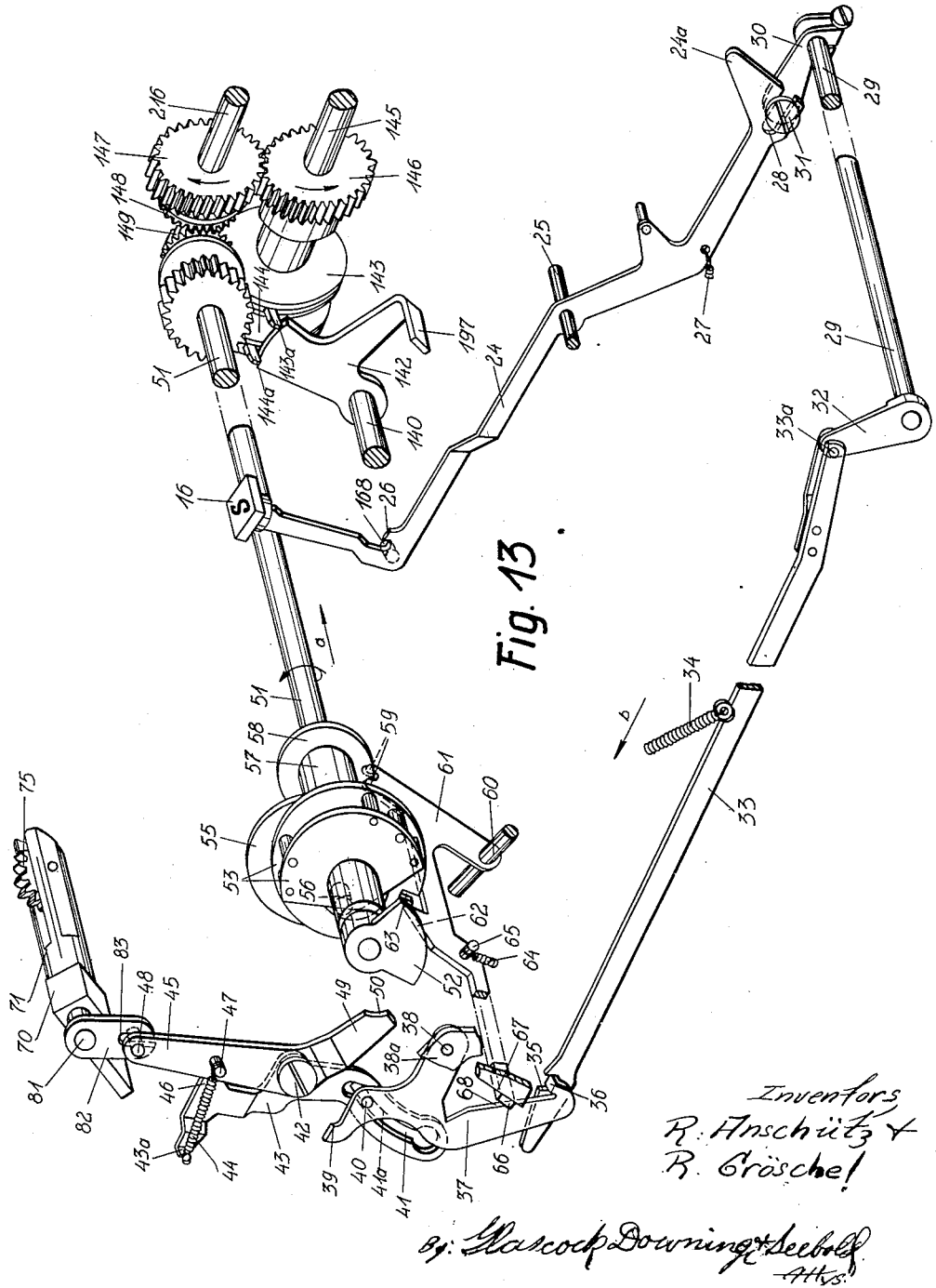

Feb. 29, 1944.   R. ANSCHÜTZ ET AL   2,342,782
CALCULATING MACHINE
Filed July 13, 1938   11 Sheets-Sheet 11

R. Anschütz &
R. Groschel
Inventors.

By: Glascock Downing & Seebold
Attys.

Patented Feb. 29, 1944

2,342,782

UNITED STATES PATENT OFFICE 2,342,782

CALCULATING MACHINE

Robert Anschütz, Zella-Mehlis, Thuringia, and Richard Gröschel, Suhl, Thuringia, Germany; vested in the Alien Property Custodian Application July 13, 1938, Serial No. 219,073
In Germany July 15, 1937

13 Claims. (Cl. 235—73)

This invention relates to a calculating machine with a transfer device between at least one of the totalizers on the carriage of the machine and a storage device.

This invention is an improvement of the machine disclosed in Patent No. 2,173,635 to A. F. Pott.

In that machine, the storage key must be operated twice for adding a value which is in a totalizer, to a value which is already in the storage device. When the storage key is operated for the first time, the value in the storage device is added to the value in the totalizer and the tens transfer—if any—is effected by the tens transfer mechanism of the totalizer. The machine comes to rest at the end of its cycle and the storage key is operated for the second time. Upon this operation, the total obtained by the addition of the value in the totalizer and the value in the storage device, is transferred to the storage device.

It is the drawback of that machine that the storage key must be operated twice, for if the operator inadvertently does not operate it the second time, a miscalculation will result.

This drawback is eliminated according to the present invention, as follows:

Upon operation of a key which causes the operation of a transmission driving the totalizers from the storage device, a transmission driving the storage device from the totalizers is placed in readiness for action and, under the control of the first-mentioned transmission, drives the storage device from the totalizers.

In the accompanying drawings the invention is illustrated by way of example as adapted to a calculating machine of the type known as the "Mercedes-Euklid."

In the drawings

Fig. 7 is a perspective illustration of the parts along the section line 7—7 in Fig. 1.

Figs. 8 and 9 are elevations showing certain parts illustrated in Fig. 7 in their inactive and active positions, respectively.

Fig. 10 is a perspective illustration of the parts along the section line 10—10 in Fig. 1.

Fig. 10a is a perspective illustration showing certain parts illustrated in Fig. 10 remote from each other for the sake of clearness.

Figs. 11 and 12 are illustrations of the parts shown in Fig. 10, in elevation and in the inactive and active positions of the parts, respectively.

Fig. 12a shows certain parts illustrated in Figs. 11 and 12, in intermediate positions.

Fig. 13 is a perspective illustration of certain parts arranged at the left hand side of the machine, and viewed from the left in Fig. 1.

1. General description of the machine

Figure 1:
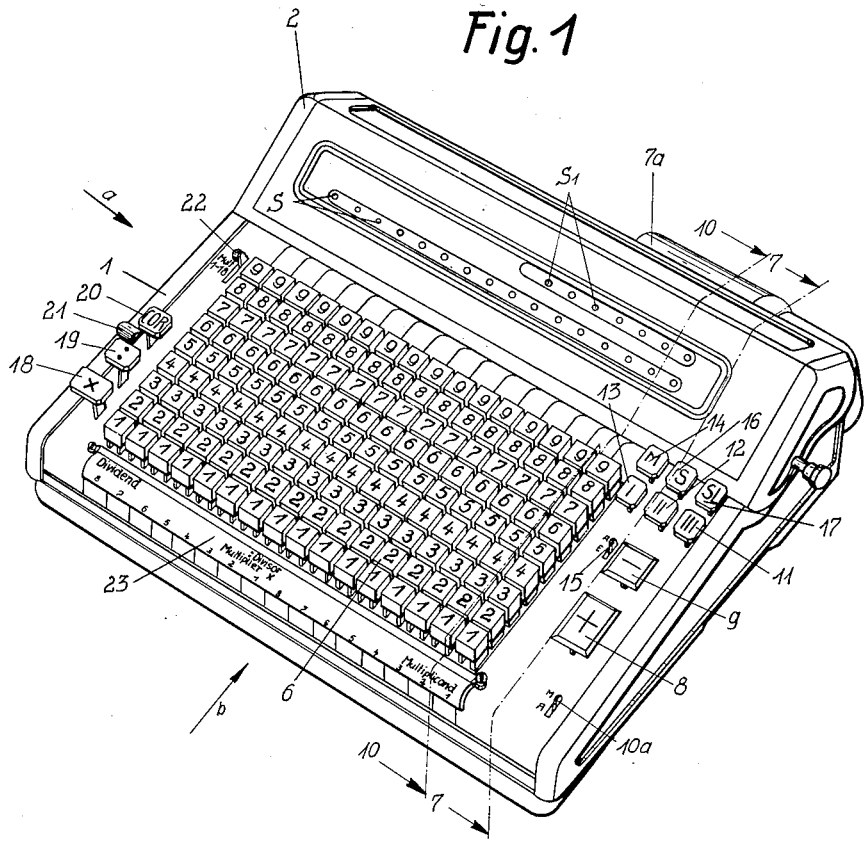
Fig. 1 is a perspective illustration of the machine.

The machine, as mentioned, is of the "Mercedes-Euklid" type. The mechanism of the machine is enclosed in a casing 1 whose elevated rear portion contains a carriage 2 on which a totalizer having sixteen orders is arranged. The numeral wheels of the totalizers are read through holes S in the front wall of the elevated casing portion, and the indications of the revolutions counter, also on the carriage, are read through holes S₁. A motor 7a, at the rear of the machine, operates its main driving shaft through a worm gear, not shown.

The machine is equipped with a key board having sixteen rows of keys 6, for entering values into the totalizer through an actuating means. Special keys are arranged at the right and at the left of this key board. The keys at the right are: An addition key 8 (+), a subtraction key 9 (—), a key board clearing key 11 (III), a totalizer clearing key 12 (II), a clearing key 13 (I) for the revolution counters, a threefold multiplication key 14 designated (M), a storage key 16 (S), and a clearing key 17 (SL) for the storage device. A controlling handle 10a for the addition and subtraction keys 8 and 9 projects from a slot in the top plate of the casing 1. When this handle is at "M," as shown, the shaft 145 of the (Figs. 7 to 12) actuating mechanism rotates as long as one of the keys 8 or 9 is held in depressed position. When the handle is at "A," the shaft performs one revolution only upon depression of one of the keys. Another handle 15 controls the clearing of the revolution counters during three-fold multiplication. Arranged at the left of the keyboard are a multiplication key 18 (×), a division key 19 (÷), and a correction key 20 (COR). A handle 21 is arranged for changing over from positive to negative multiplication or division, and vice versa, and a handle 22 is arranged for interrupting the multiplication.

An inscription strip 23 is arranged in front of the key board. At its left hand end, the strip bears the inscription "Dividend" and at its right hand end "Multiplicand" and intermediate these inspections the strip bears the inscriptions "Multiplier" and "Divisor." These inscriptions indicate that in multiplication the eight right-hand rows of the keys 6 are for use in setting up the multiplicand and the eight left-hand rows are for use in setting up the multiplifier, and in division the nine right-hand rows of the keys 6 are for use in setting up the divisor and the seven left-hand rows are for use in setting up the dividend.

Figure 2:
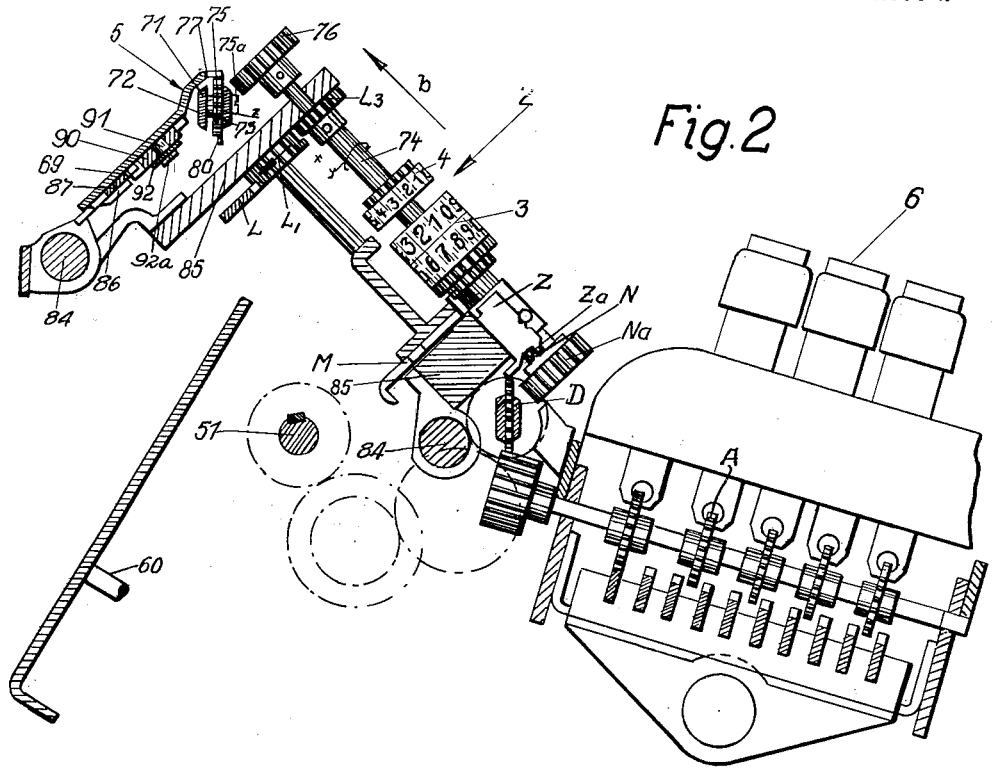
Fig. 2 is a central vertical cross section, viewed in the direction of the arrow a in Fig. 1 and showing part of the actuating means of the machine, one order of its totalizer, and the storage device in its inactive position with respect to the totalizer.

Referring now to Fig. 2, the carriage 2 comprising a pair of plates 85 is mounted to slide on a pair of parallel bars 84 in the elevated rear portion of the casing 1, supports the shafts 74 of the totalizer with numeral wheels 3, the seven right-hand totalizer wheel shafts also supporting the revolution counters 4. A plate 69 is secured to the frame of the machine and arranged behind the rear plate 85 of the carriage and supports a storage device 71 whose gears 75 can be moved into mesh with spur gears 76 at the upper ends of the totalizer shafts 74.

2. *The mechanism for controlling the connection of the storage device and the totalizers*

Figure 14:
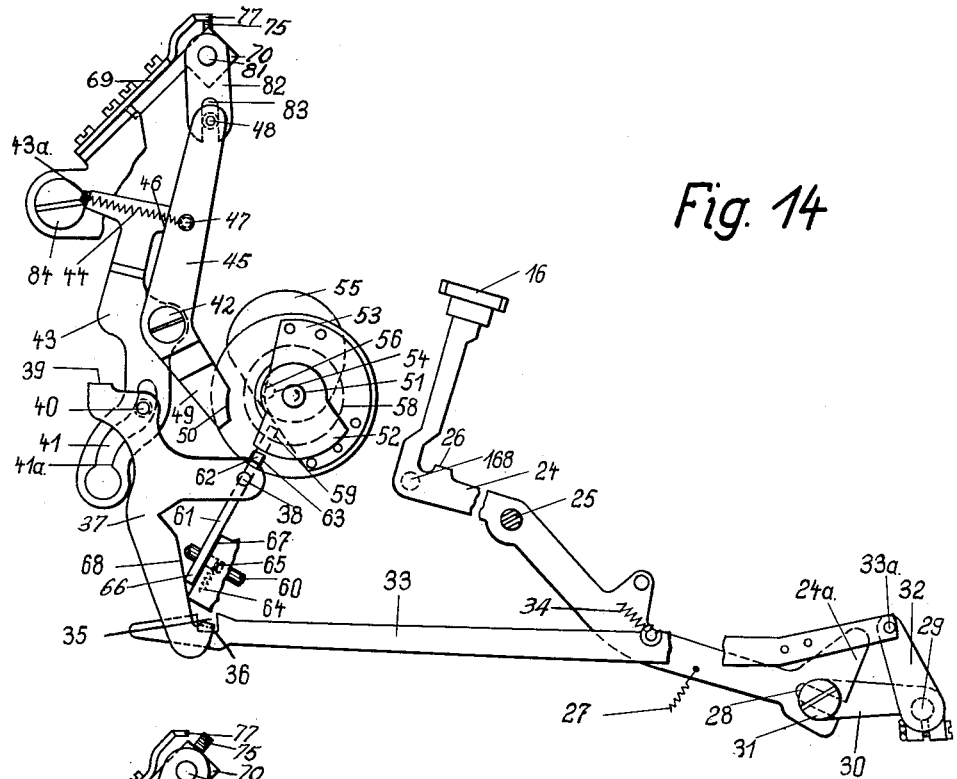
Figs. 14 and 15 are elevations of the parts illustrated in Fig. 13, in their inactive and active positions, respectively.
Figure 15:
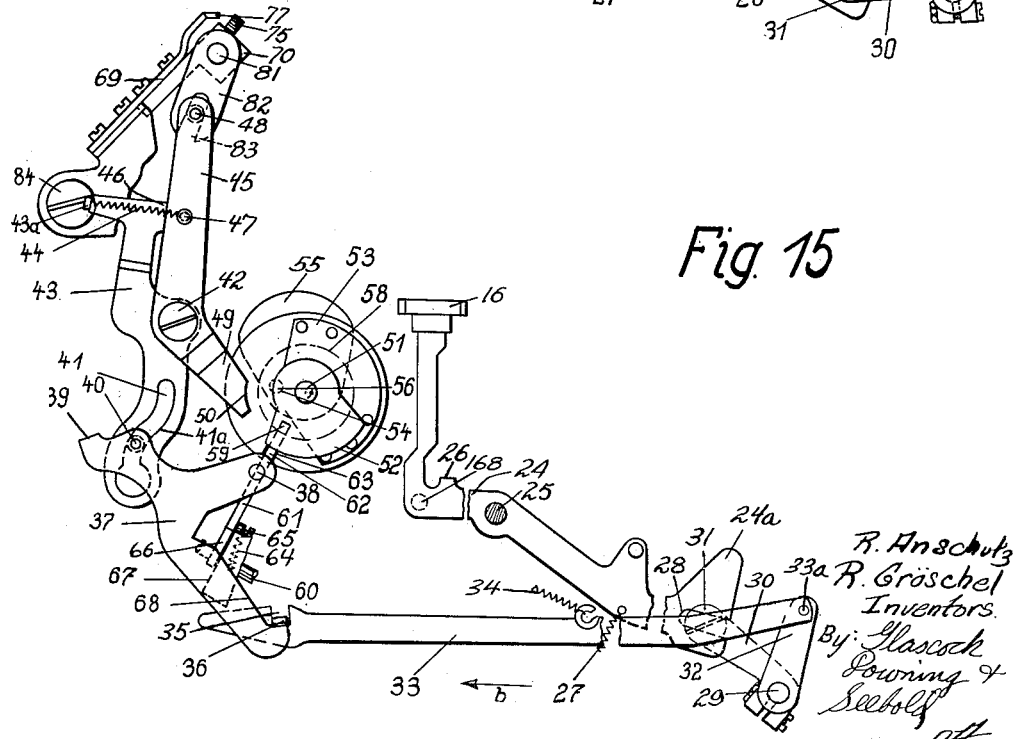
Figure 16:
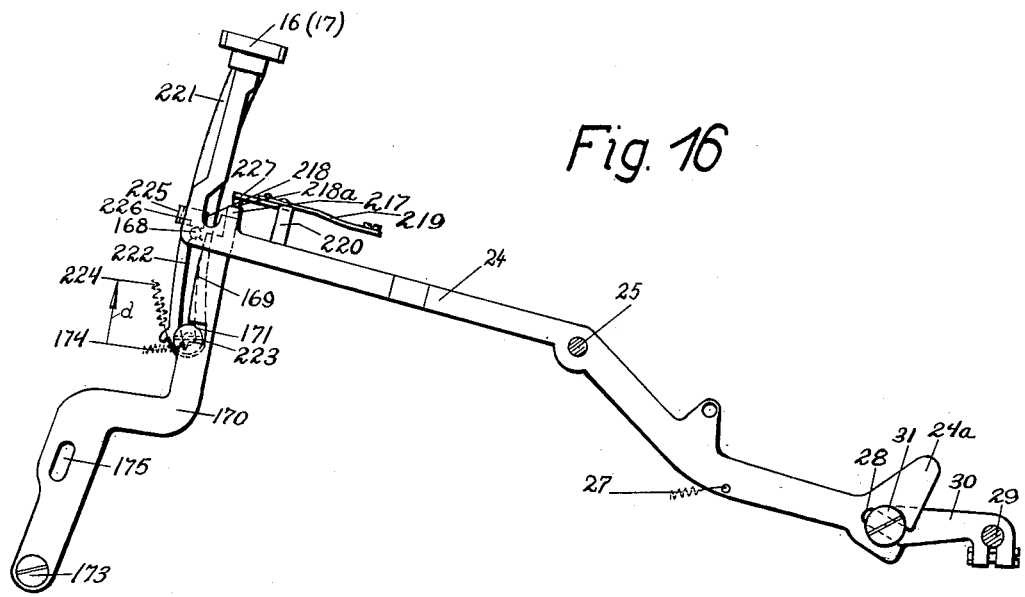
Fig. 16 is an elevation showing the storage key and clearing key for the storage device in their initial positions, as viewed in the direction of the arrow a in Fig. 1.

Referring now to Figs. 13, 14, and 15, the lever 24 of the storage key 16 (S) at the right of the machine is mounted to swing about a fixed bar 25 secured in the frame of the machine. A spring 27 connected to that part of the key lever 24 which is at the front of its fulcrum 25 turns the lever clockwise and holds a projection 26 on the lever against a fixed abutment—not shown—which determines the normal position of the key 16. The front end of the key lever 24 has a projection 24a arranged to engage an abutment—not shown—and is slotted at 28 to engage a headed screw 31 at the free end of an arm 30 on the right-hand end of a shaft 29 mounted to turn in the frame of the machine. Another arm 32 is fixed to the opposite end of the shaft 29 and pivotally connected to the front end of a rod 33 at 33a. The rear end of the rod is notched at 35 and is held against a hook 36 at the lower end of a T lever 37 by a spring 34 pulling the rod in the direction of the arrow b and upwards at the same time. The T lever 37 is fulcrumed on a bracket 38a (Fig. 13) at 38. The upper end 39 of the T-shaped lever engages below an abutment—not shown—on the bracket 38a in its initial position, Fig. 14. A pin 40 on the upper end of the lever engages in a curved slot 41 in the lower end of a link 43 mounted to swing about a headed screw 42 in the frame of the machine. A bellcrank 45, 49 is mounted on the same headed screw and a spring 44 attached to the upper arm of the bellcrank at 47 and to the upper end of the link 43 at 43a pulls the arm against a projection 46 on the upper end of link 43.

A pin 48 at the free end of the upper arm 45 engages in a slot 83 in the free end of a crank 82 which is secured to the end 81 of a shaft 70b and which forms part of the storage device and is mounted to rotate in bearings 70 on the plate 69.

The lower arm 49 of the bellcrank is offset, and its free end is provided with a curved recess 50 for cooperation with a cam sector 52 keyed on the tens transfer shaft 51. The drive of the tens transfer shaft is illustrated in Fig. 13 at the right. The main driving shaft 145 which, as mentioned, is driven from the motor 7a through a worm gear—not shown—is equipped with a spur gear 146. A spur gear 147 on a driving shaft 216 meshes with the spur gear 146, their direction of rotation being indicated by the arrows. A bevel gear 148 on the spur gear 147 meshes with a bevel gear 149 on the tens transfer shaft 51 which is rotated counter-clockwise.

A pin wheel 53, with a sector-shaped end plate at the left, and a fully circular end plate at the right, is mounted to turn freely on the tens transfer shaft 51 but held against axial displacement. The pin wheel 53 controls the rotatable coupling mechanism D between the key-controlled actuating mechanism and the totalizer wheels 3, Fig. 2. A sleeve 57 is splined on the tens transfer shaft 51 at the right of the pin wheel 53 and supports a cam plate 55 at the left, and a flange 58 at the right. In the position illustrated in Fig. 13, the cam plate 55 lies adjacent the pin wheel 53, and a coupling pin 56 on the cam plate 55 projects into a hole 54 in the full end plate of the pin wheel 53. The pin wheel now rotates with the tens transfer shaft.

The sleeve 57 is shifted by a coupling lever 61 mounted to swing about a pin 60 in the machine frame. The position of this pin with respect to the carriage 2 is shown in Fig. 2. A fork 59 at the right-hand end of the coupling lever 61 engages the flange 58 on the sleeve 57 and a spring 64 attached to the coupling lever 61 at 65, turns the lever anti-clockwise so that it pushes the sleeve against the pin wheel 53. A tooth 62 on the coupling lever is arranged to engage in a notch 63 of the full pin wheel disk 53 to hold the disk against rotation with the tens transfer shaft. Normally, the tooth 62 clears the disk and notch in the coupling position illustrated in Fig. 13. The coupling lever 61 has an extension 66 which, under the pull of the spring 64, slides along the inclined edge of a member 67 fixed to the machine frame, until it is arrested by the edge 68 of the T lever 37. This is the initial position of the coupling lever.

When the storage key 16 is depressed to transfer a value from the totalizer, its key lever 24 is swung anticlockwise until its projection 24a is arrested by the aforesaid abutment—not shown —the shaft 29 and its arms 30 and 32 are turned clockwise, and the rod 33 is drawn in the opposite direction of arrow b. Through the notch 35 in the rod and the hook 36 on the T lever 37, the latter is swung anticlockwise and its pin 40 acts on the edge 41a of the slot 41 in the link 43, turning the link anti-clockwise. The spring 44 turns the upper arm of the bellcrank 45, 49 which, as described, is mounted to swing on the headed screw 42 with the link 43, anti-clockwise. In turn, the bell crank 45, 49, through the pin 48 at the upper end of the arm 45, and the slot 83 in the crank 82, moves the storage device from its inactive position, Fig. 2, into its active position, Fig. 3.

The swinging of the upper arm 45 of the bellcrank in anti-clockwise direction moves the lower arm 49 with its recess 50 into the path of the sector 52. The T lever 37 when turned anti-clockwise raises the extension 66 of the coupling lever 61 by its edge 68 and turns the coupling lever clockwise. This causes the tooth 62 to engage in the notch 63 in the full end plate of the pin wheel 53 so that the pin wheel is now held against rotation, while at the same time the fork 59 shifts the sleeve 57 on the shaft 51 in the direction of the arrow $a$ in Fig. 13. This moves the coupling pin 56 out of the hole in the full end plate of the pin wheel 53 so that the tens transfer shaft 51 rotates without being interfered with by the arrested pin disk 53. When the tens transfer shaft has turned through about two thirds of a complete revolution, its sector 52 strikes the recessed lower arm 49 of the bellcrank and turns the bellcrank clockwise against spring 44. The crank 82 turns anti-clockwise and moves the storage device 71 into its inactive position, Fig. 2. This condition continues while the sector 52 slides over the recessed portion 50 of the lower bellcrank arm 49. When the sector has moved off the recess, the spring 44 returns the parts into their set positions, Fig. 15, and the storage device 71 is automatically returned into active position again. When the storage key 16 is released, the members connected to it return into their initial positions, as shown in Fig. 14.

3. The storage device

Figure 4:
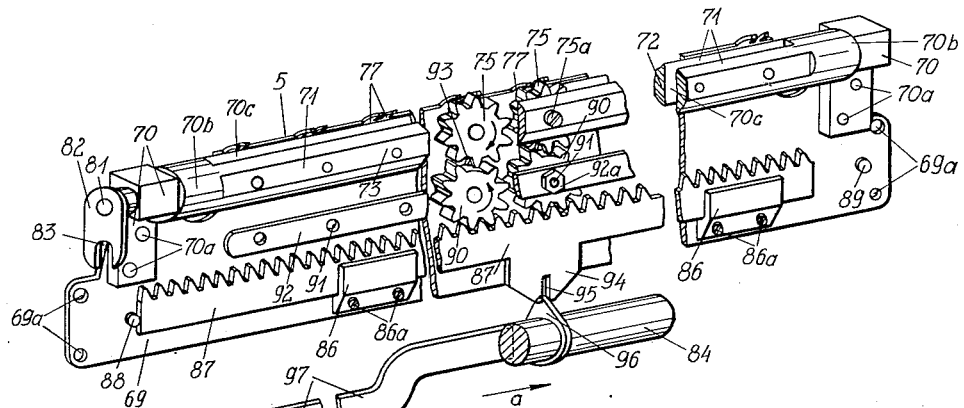
Fig. 4 is a perspective illustration of the storage device and the transmission mechanism for rotating its gears, viewed from the front and the left.
Figure 6:
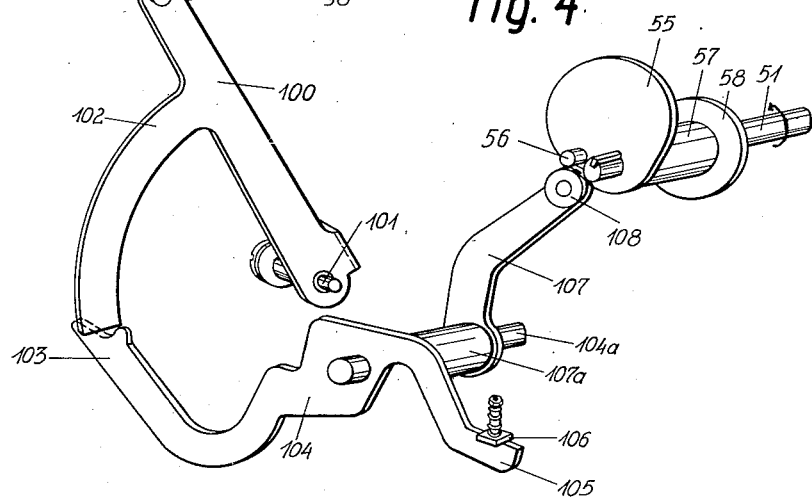
Fig. 6 is a perspective illustration of the gear, viewed in the direction of the arrow c in Fig. 5.
Figure 5:
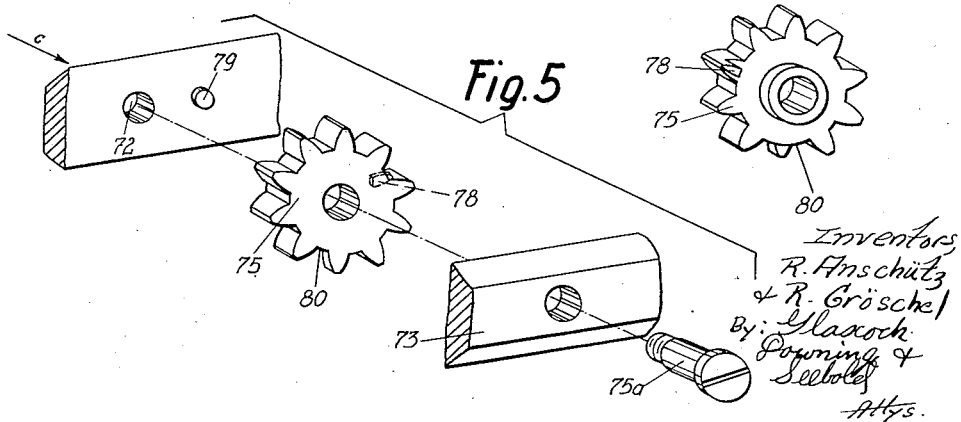
Fig. 5 is a perspective illustration showing one of the storage gears, the pin it rotates about, and the means for holding it against axial displacement.

Referring now to Fig. 4, the plate 69 is secured to the frame of the machine at the rear by screws inserted in holes 69a in opposite ends of the plate. The bearing 70 for the shaft end 81 at the left has already been referred to, and a similar bearing is provided for the shaft end at the other end of the storage device 71. The two bearings 70 are made with plates for securing them to the plate 69 by screws 70a. The shaft 70b comprising a part of the storage device is solid only at both ends where it is journaled and otherwise consists of two parallel bars 72 and 73, with a milled slot between them. The outer faces of the bars are flattened, as best seen in Fig. 5. Sixteen storage gears 75 are mounted to rotate on the shanks of headed screws 75a between the bars 72 and 73. A zero stop 78, Fig. 6, projects from the rear face of each gear 75 and a check 79 is provided on the inner side of the rear bar 72 for cooperation with the zero stop. One tooth of each gear 75 is cut away for half its depth to form a zero gap 80, Fig. 6. The zero stop 78 and the check 79 define the zero position of the storage gears, the stop abutting against the check from above as the corresponding gear 75 rotates in the direction of the arrow in Fig. 4. The stop and the check also prevent overthrowing of the gears 75.

The upper portion of the plate 69 is rearwardly bent at 5, Fig. 2, and equipped with a pair of prongs 77 for each storage gear 75 which engage a tooth of each gear, when the storage device is in its ineffective position, Fig. 2, holding the gears against turning.

As described under sub-heading "2," "The mechanism for controlling the connection of the storage device and the totalizer," depression of the storage key 16 causes the storage device to move into its active position in which the gears 75 mesh with the totalizer spur gears 76, and, after a value has been entered in the storage device, the storage device returns into its inactive position in which its gears are blocked by the prongs 77.

4. The clearing device of the storage device

This device which has been illustrated in Fig. 4, is referred to as the "clearing device" because it serves for clearing a value which has been entered in the storage device. But it also serves for adding a value which is entered in the storage device to a value which has already been entered in the accumulator.

Two L-shaped brackets 86 are secured to the plate 69 by screws 86a near its lower edge and a clearing rack 87 is mounted to slide in the brackets. In its initial position, the rack 87 bears against a check 88 with its left-hand end, and its movement toward the right is limited by another stop 89. A clearing gear 90 is arranged below each storage gear 75 in meshing relation on a pin 91. A strip 92 holds the clearing gears 90 on the pins 91 and is, in turn, secured by nuts 92a on the outer ends of some of the pins 91. By these means, the clearing gears 90 mesh with the corresponding storage gears 75 above, and with the rack 87 below. Each clearing gear has a zero gap 93, Fig. 4, which, like the gaps 80 in the storage gears 75, extends for half the width of a tooth.

The clearing rack 87 is operatively connected to the cam plate 55 on the sleeve 57 by the following mechanism: A fork 94, with a slot 95, projects downwardly from the clearing rack 87. A flange 96 which is mounted to slide on the lower slide bar 84 supporting the carriage, engages in the slot 95 and is secured to the right-hand end of a rod 97 whose other end is pivotally connected to a sector lever 100 fulcrumed about a headed screw 101 in the rear wall of the machine. A spring 98 attached to the rod 97 at 99 pulls the rod to the left and holds the lower end of the sector 102 on the sector lever 100 against the notched upper end of the rear arm 103 of a double-armed lever 104. This lever is secured to one end of a sleeve 107a mounted to turn on a bar 104a secured in the left-hand side wall of the machine. The front arm of the double-armed lever 104 bears against a headed screw 106 with its end 105, against which it is held by gravity since the rear arm 103 is heavier than the front arm. Also fast on the sleeve 107a is a roller arm 107, with a roller 108 at its upper end, held against the cam plate 55 on the tens transfer shaft 51 by the weight of the arm 103.

Figure 3:
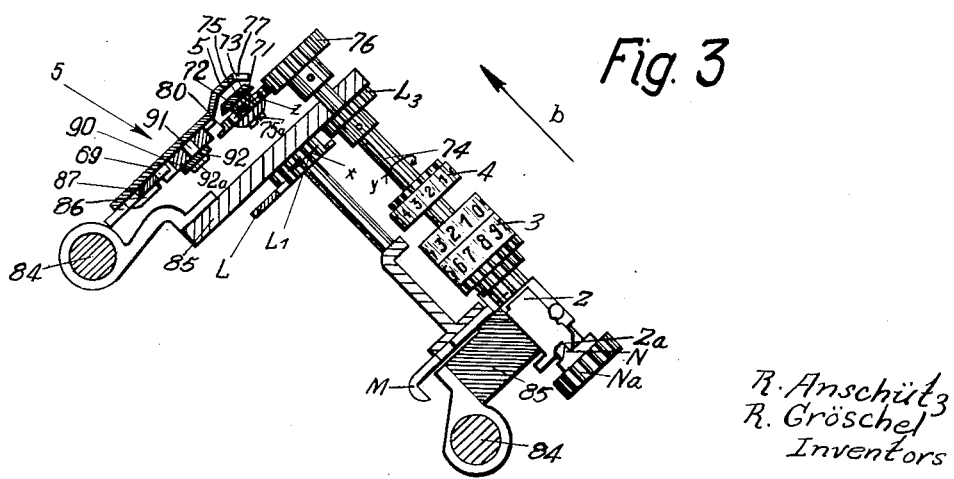
Fig. 3 shows part of Fig. 2, with the storage device in its active position with respect to the totalizer.

When the storage device 71 has been moved into its active position, Fig. 3, by depression of the key S, its gears 75 mesh with the spur gears 76 on the totalizer shafts 74 and with the clearing gears 90 on the plate 69 and are clear of the prongs 77. At the same time, the coupling lever 61, Fig. 13, has shifted the sleeve 57 to the right in the direction of the arrow $a$, so that the cam plate 55 is moved out of coupling relation to the pin wheel 53, and is presented to the roller 108 on the arm 107. When the tens transfer shaft 51 rotates anti-clockwise, as indicated by the arrow in Fig. 4, the elevated portion of the cam plate 55, through roller 108 and arm 107, swings the lever 104 clockwise to cause its arm 103 to rock the sector 102 of the lever 100, and shift the rod 97 and the rack 87 in the direction of arrow a.

If there is no value in the storage device 71, that is, if its gears 75 are at zero, their zero gaps 80 are in line with the zero gaps 93 of the clearing gears 90, as shown in Fig. 3, so that the rotation of the clearing gears in anti-clockwise direction, Fig. 4, does not influence the storage gears 75. On the other hand, if a value has been transferred to the storage device 71, solid teeth of the storage gears 75 are in line with the zero gaps 93 of the clearing gears, and so the clearing gears rotate the storage gears until the zero gaps 80 in the accumulator wheels 75 are again in line with the clearing gears 90. At the same time, the zero stops 78 of the storage gears are arrested by the checks 79, and overthrowing is prevented. Since the storage gears 75 mesh with the spur gears 76 at the upper ends of the totalizer shafts 74, Fig. 3, the shafts are rotated clockwise, as indicated by the arrow y, and the value which has been stored in the storage device 71, is transferred back to, and accumulated with the value already present in the totalizer. At this moment, the highest point of the cam plate 55 is in contact with the roller 108, and, as the tens transfer shaft 51 continues its rotation and the reduced portion of the cam plate 55 is presented to the roller 108, the rack 87 is allowed to return into its initial position against the check 88 at the left under the action of the spring 98. The clearing rack 87, during such return, reversely rotates the clearing gears 90 until their zero gaps 93 register with the zero gaps 80 of the storage gears without turning said storage gears.

5. *Effecting an operation of the tens transfer mechanism upon transferring an amount from the storage device back into the accumulator*

The functions required for the accumulation of values necessitates a complete revolution of the tens transfer shaft 51, and the following mechanism is provided for performing this: Referring to Fig. 10, an arm 109 is keyed on the shaft 29 and a rod 110 is pivotally connected to the free end of the arm. At its rear end, the rod is equipped with a lug 111 which is arrested by a recessed intermediate frame part 112. A headed screw 113 at the rear end of the rod 110 guides the rod in a slot 114 in the frame part 112 and a catch 115 is mounted to swing about the headed screw. A spring 117 whose upper end is secured to the frame part 112, holds a lug 116 extending at right angles from the catch 115, against a curved face 118 of the frame part 112.

A step 119 is arranged on the rear end of the catch 115 which step cooperates with a lug 120 of a bellcrank 121. In the inactive position of the mechanism, the lug 120 engages in a recess 122 in the catch 115. The bell cranks 121 and 123 are mounted to swing about a headed screw 125 in a lever 126 having a curved slot 138. The slotted lever 126 is mounted to swing about a bar 127—see also Fig. 10a—arranged in the machine frame. A headed screw 128 in the slotted lever 126 engages in a curved slot 129 of the bellcrank 121. The bellcrank 121 is thus enabled to perform a limited swinging movement independently of the slotted lever 126. A spring 130 secured to a pin 123a of the bellcrank 123 at one end, and to a pin 126d of the slotted lever 126 at the other end, tends to turn the bellcrank 123 anti-clockwise, the initial position of the bellcrank 123 being determined by a lug 132 engaging the bellcrank 121. The bellcrank 121 is normally held by a spring 129b with the right-hand end 131 of the slot 129 against the headed screw 128 projecting from the lever 126. The spring 129 is anchored in the machine frame and attached to the pin 129a of the bellcrank 121, the spring with the levers 121 and 126 making up a single unit so that the lever 126 is turned clockwise by the spring 129b about the bar 127, its initial position being defined by its edge 126e engaging an abutment 133 in the machine frame, Fig. 10.

The arm 134 of the bellcrank 123 is also able to cooperate with the abutment 133, the arm 134 lying above the abutment 133 in the initial position of the mechanism.

Two tens transfer cams 135 on the tens transfer shaft 51 are connected by a stay 136 and this stay is in the path of an extension 137 of the bellcrank 121.

The lever 126, Fig. 10a, has shoulders 126a and 126b at the side of its curved slot 138, and these cooperate with a pin 139, Fig. 10, at the free end of an arm 141 on a clutch control shaft 140 mounted to rotate in the frame of the machine. At its right-hand end, the clutch control shaft 140 supports a clutch arm 142 which controls the actuating mechanism clutch 143 and the carriage shift clutch 144 on the main driving shaft 145. The actuating mechanism clutch 143 effects a complete revolution of the tens transfer shaft 51 through the gearing 146 etc. illustrated in Fig. 13. In its normal position, the pin 139 at the end of the arm 141 occupies the position illustrated in Fig. 11 with respect to the slotted lever 126 in which the lower edge of the pin 139 is in line with the shoulder 126a, and its left edge is below, and in front of, the right-hand edge of the shoulder 126b. The arc described by the pin 139 is so determined that, when the pawl 144a of the carriage shift clutch 144 is released for one step in the feed of the carriage, that is, upon oscillation of the clutch control arm 142 in clockwise direction, the pin 139 engages the shoulder 126a of the slotted lever 126 and locks the storage key 16 since the pin does not permit swinging of the slotted lever 126 anti-clockwise. The pin 139, by contacting the shoulder 126b, also locks the storage key 16 when the pawl 143a of the actuating mechanism clutch 143 has been released for a calculating operation by turning the shaft 140, and the arm 141, anti-clockwise, since the pin 138 then lies in contact with the shoulder 126b.

The operation of this mechanism is as follows: When the storage key 16 is depressed, the shaft 29 and its arm 109 are turned clockwise. The arm 109 shifts the rod 110 in the direction of the arrow c. The catch 115 fulcrumed to the rod 110 is turned slightly about the screw 113 anti-clockwise against the spring 117 by its lug 116 sliding along the curved edge 118 of the stationary frame plate 112. As the slot in the catch 115 normally engages the lug 120 of the bellcrank 121, the bellcrank is also pulled in the direction of the arrow c. The three levers 121, 123, and 126 are swung together anti-clockwise about the bar 127 against the tension of spring 129b. The arm 134 of the bellcrank 123 strikes the abutment 133 and is swung slightly about the screw 125 in clockwise direction, tensioning the spring 130 engaging its lug 132. Immediately after, when the bellcrank 123 has cleared the abutment 133, it is turned anti-clockwise by the spring 130, as shown in Fig. 12, engaging in front of the abutment 133, by which means the storage key 16, if released prematurely, is held in its depressed position and the entire mechanism is locked in its active condition.

During the swinging of the lever 126, the pin 139 on the arm 141 on the clutch control shaft 140 slides along the shoulder 126a and up in the slot 138 of the lever 126 to turn the shaft 140 anti-clockwise. The clutching lever 142 releases the pawl 143a of the actuating mechanism clutch and the clutch is thrown in.

Through mechanism which is known in the art and has not been illustrated, the circuit of the motor 7a is closed when the storage key 16 is depressed and the main driving shaft 145 is rotated anti-clockwise, as viewed in Fig. 13. When the pawl 143a is released the clutch 143 is connected to the main driving shaft and the tens transfer shaft 51 is rotated by the means described and illustrated in Fig. 13. As the tens transfer shaft 51 must perform only a single revolution during the accumulating and tens transfer operation, the clutch 143 must be disconnected after the first revolution. A short time before the tens transfer shaft 51 has completed its first revolution, the stay 136 of the tens transfer cams 139 strikes the edge 137 of the lever 121 and swings this clockwise for about the distance permitted by the slot 129. The lug 120 on the horizontal arm of the lever 121 now leaves the recess 122 in the catch 115 and the upward extension 137 of the lever 121 engages the lug 132 of the bellcrank 123 and swings this clockwise against the spring 130 to disengage its arm 134 from the abutment 133. When the stay 136 is on the highest point of the arm 137 of the lever 121, spring 129b swings the three levers 121, 123, and 126 counter-clockwise until the lug 120 of the lever 121 engages the step 119 of the catch 115, Fig. 12a, but the catch and the arm 109 and rod 110 remain in active position under the action of locking means 168, 170, and 171, Fig. 7, as will be described in connection with the clutch means for the clearing members of the result totalizers. By the swinging motion of the lever 126 the pin 139 on the arm 141 of the clutch control shaft 140 is forced out of the cam slot 138 of the lever 126, turning the clutch lever 142 clockwise so that it returns into the path of the pawl 143a of the actuating mechanism clutch 143 to effect disengagement of the actuating clutch after one revolution of the tens transfer shaft 51. When the storage key 16 is released from the locking action of the means 168, 170, and 171, the spring 27 of the key lever 24 returns the parts 109, 110, and 115 into their initial positions, Fig. 11, as determined by the lug 111 of the rod 110 engaging the intermediate wall 112, and spring 129b returns the levers 121, 123, and 126 into their initial positions.

Even though the operator maintains the storage device key 16 depressed after the completion of a machine cycle, no operation of the calculating wheels 3 or of the storage device wheels 75 can occur, because the shoulder 119 of the catch 115 will still rest on lug 120 of the arm 121, thus depriving the storage device key 16 of all control over the clutch control arm 141 on the clutch control shaft 140.

6. *The uncoupling mechanism for the revolution counters*

The revolution counters 4 must not be operated when the storage key 16 is depressed. The rod 110 has a hole 150, as best seen in Fig. 10, and in this engages a pin 153 at the free end of an arm 154 whose hub 155 is keyed on a shaft 156. The pin 153 is arranged to slide along an incline 151 forming part of one side of the hole 150. At the right-hand end of the shaft 156, another arm 157 is arranged whose pin 158 engages in a slot 159 in a push rod 162 having a pair of lugs 160, 161, slidable along a guide, not shown. The offset, rear end 163 of the push rod is pivoted to a bellcrank 164 fulcrumed on a headed screw 165, one arm of which bell crank engages between a pair of flanges 166 on a draw key 167 which operates the reversing mechanism, not shown, of the revolution counters 4.

When the storage key 16 is depressed, the rod 110 is shifted in the direction of the arrow c and the pin 153 rides upwardly along the incline 151 and engages in a slot 152 of the cam aperture 150. The shaft 156 is turned anti-clockwise and the push rod 162 is moved into the position shown in Fig. 12 to shift the draw key 167 to its intermediate position and render ineffective the reversing mechanism for the revolution counters 4.

The revolution counters 4 and the operation of the draw key 167 are fully disclosed in Patent No. 2,143,741.

7. *The clutch means for the cancelling members of the result totalizers*

When a value is to be stored the corresponding numeral wheels 3 must be cancelled. A pin 168 on the key lever 24 of the storage key 16, Fig. 7, is arranged to slide along the convex edge 169 of a lever 170 and to engage in a notch 171 at the lower end of the edge. The lever is mounted to swing about a headed screw 173 in a bracket 172 suitably attached to the right-hand side plate of the machine and a spring 174 pulls the lever counter-clockwise against the pin 168. A lug 176 on a U-shaped frame 177 projects into a slot 175 in the lever 170. The frame is mounted to swing about, and to slide on, a bar 180 secured in two eyes 178 and 179 of the bracket 172. The base plate 177 of the U-frame is equipped with a laterally projecting arm 181. The lower edge of the arm engages a pin 182 forming part of a bail 184 mounted to swing about a bar 183. A hook 185, 186 on the bail engages below a connecting rod 187. A spring link 188 is connected to the lower end 186 of the hook and to a pin 189 on the connecting rod, to yieldingly retain the hooked end against an abutment 190 on the rod. Another spring 191 pushes the connecting rod 187 opposite to the direction of the arrow c. A slot 192 in the front end of the connecting rod engages a pin 194a at the lower end of the key lever 193 of the totalizer clearing key 12. In its upper final position, the key lever 193 bears against an abutment, not shown, with a projection 193a.

The rear end of the rod 187 is pivotally connected to a lever 194 mounted to swing about a bar 195. The lever has a projection 198 and a slot 196 below the projection, and a lateral extension 197 of the clutch lever 142 normally lies in alinement with the open end of the slot 196. A lug 199 of the lever 194 controls the clutch lever 200 of a clearing clutch 203. The lever 200 is fulcrumed on a headed screw 201 and its arm 202 cooperates with a pawl 204 on the clutch. A clearing rod 206 is pivoted eccentrically to the clutch 203 at 205 which, through rack L, pinion L₁, and spur gear L₃, Fig. 2, effects the clearing of the result totalizer as fully disclosed in the above mentioned Patent No. 2,173,635 under the heading "Clearing mechanism for the accumulator".

The pivot pin 205 which connects the rod 206 to the clutch 203, cooperates with the end 207 of a shift lever 209 pivoted on a headed screw 208 in the bracket 172. The shift lever 209 which is guided in a notch 211 formed in the ear 179 of the base plate 172, is forked at 212 to embrace the rear shank 213 of the U frame 177. The upper edge of the shank 213 has formed thereon a curved cam 214 to cooperate with a cam 215 on the shaft 216, Figs. 8 and 9.

The lever 170 connected to the slidable and rockable U-frame 177 by the lug-and-slot connection 175, 176, has a tooth 217 at its upper end for cooperation with a catch 218a at the free end of a spring 219 to which the catch is riveted at 218. A lug 220 on the spring is arranged in the path of the key lever 24 of the storage key 16.

It will be recalled, as described under Title 5, that depression of the storage device control key 16 effects the release for operation of the accumulating and tens-transfer clutch 143, through the medium of the catch 115, cam-slotted lever 126, clutch control arm 141 on clutch control shaft 140, and clutch control lever 142.

By the same depression of the storage device control key 16 positions its pin 168 in register with the notch 171 in the shift lever 170, whereupon the spring 174 rocks the shift lever 170 rearwardly to fit the notch 171 over the pin 168, until the inner wall 171a of the notch contacts the pin 168 whereby the shift lever is arrested.

The shift lever 170 on such counterclockwise rocking, shifts the U-frame 177 axially towards the left (Fig. 7) from the position shown in Fig. 8 to that shown in Fig. 9, through its slot and lug connection 175, 176, in order to locate the cam 214 on the left-hand arm 213 of the U-shaped frame in the path of rotation of the cam 215 projecting radially from the shaft 216.

Furthermore, the U-shaped frame, as it shifts axially, rocks the angular lever 209 counterclockwise through the engagement of the fork 212 of the angular lever with the left-hand arm 213 of the U-shaped frame, to project the left-hand end 207 of the angular lever into the path of rotation of the pin 205 on the clearing clutch 203.

Rotation of the clutch 143 drives its shaft 145 and gear 146, which gear meshes with the gear 147 on the shaft 216 (Figs. 8 and 9) to rotate it clockwise (Fig. 13) and a bevel gear 148 on the gear 147 meshes with a companion bevel gear 149 on shaft 51 to rotate the tens-transfer shaft 51.

Furthermore, as heretofore explained, a cross stay 136 (Figs. 10 and 11) supported by two of the tens-transfer cams 135, operates shortly before the completion of a single revolution of the tens-transfer shaft 51, to disconnect the storage device key controlled catch 115 from the bell crank 121 and displace the locking bell crank 123, whereupon the spring 129b rocks the cam-slotted lever 126 back to its normal position, which cam-slotted lever, as it returns, rocks the clutch shaft arm 141 and clutch shaft 140 to restore the clutch control lever 142 to its neutral or intermediate position, wherein it restrains both clutches 143 and 144 against operation.

While the clutch control lever 142 is in such position that it has released the clutch 143 for operation, its tail or extension 197 (Fig. 7) is positioned in the path of the projection 198 on the resetting clutch control lever 194 to lock the totalizer clearing key 12 against operation, but when the clutch control lever 142 is in its neutral position, its tail 197 lies opposite the recess 196 of the resetting clutch control lever. The shaft 216 and its spring tensioning cam 215 rotate in timed relation and in the same train with the tens-transfer shaft 51 with its tens-transfer cams 135 and cross stay 136.

Therefore, it is a simple matter to so locate the cross stay 136 on the tens-transfer cams 135, and spring tensioning cam 215 on the shaft 216 in such relation that, just prior to the return of the clutch control lever 143 to neutral position (initiated by contact of the cross stay 136 with the arm 137 of the bell crank 121), the spring tensioning cam 215 shall wipe along the cam surface 214 on the left-hand arm 213 of the U-shaped frame 177 to rock the U-shaped frame counterclockwise and hold it in such operated position for a length of time sufficient to enable the spring 129b (Figs. 10–12) to restore the clutch control lever 142 to neutral position, bearing in mind that such restoration occurs prior to the completion of the rotation of the clutch driven shafts 145, 216 and 51.

Resuming the description of the totalizer wheel clearing operation, the U-shaped frame 177 as it is rocked counter-clockwise by the cam 215, presses its arm 181 (Fig. 7) upon the pin 182 projecting from the bail 184, and rocks the bail counter-clockwise, with its depending arm 185.

The depending arm 185 attempts to draw the connecting bar 187 forwardly in the direction of the arrow c, through spring link 188, but is prevented from so doing by contact of the projection 198 of the resetting or clearing clutch control lever 194 against the tail or extension 197 of the calculating clutch control lever 142.

Consequently, the depending arm 185, in rocking counter-clockwise, tensions the spring link 188 connecting it with the connecting bar 187 and also the return spring 191.

The tensioning cam 215 because of the length of its co-acting cam face 214 on the U-shaped frame 177, maintains the U-shaped frame and the bail 184 in their operated positions to retain the spring 188 tensioned until the spring 129b, through the cam-slotted lever 126, restores the calculating clutch control lever 142 to its neutral or intermediate position, so that the extension or tail 197 rocks clockwise out of the path of the projection 198 of the clearing clutch control lever 194 and into registry with the recess 196 in such lever.

Since the restoration to neutral of the accumulator clutch control lever 142 occurs just prior to the completion of the rotation of the clutch 143 and its shafts 145, 216, and 51, the trailing, tensioning cam 215 escapes from the cam face 214 of the U-shaped frame 177, whereupon the tension stored in the spring 188 (which spring is superior to the return spring 191) snaps the connecting bar 187 forwardly and rocks the thereto-connected clearing clutch control lever 194 counter-clockwise, fitting the recess 196 over the tail 197 to thereby lock the accumulator clutch control lever 142 in its neutral position during the operation of the clearing clutch 203.

The slot 192 in the connecting bar 187 permits this spring actuation of the connecting bar and clearing clutch control lever 194 relatively to the manually operated clearing key lever 193.

The connecting bar 187 advances under the stored energy in the superior spring 188, until the shoulder 190 on the connecting bar again contacts the end 186 of the depending arm 185, at which time farther advance of the connecting bar ceases.

The resetting clutch control lever 194 on its counter-clockwise rocking, due to the advance of the connecting bar 187 under the pull of spring 188, causes its arm 199 extending forwardly beneath the clutch-disabling dog 200, 202 to rock the clutch-disabling dog to its ineffective position, thereby freeing the resetting or totalizer clearing clutch 203 for operation.

Thereupon the motor-driven shaft 145 turns the driven clutch member counter-clockwise.

Substantially simultaneously with the disengagement of the clutch disabling dog 200, 202, from the resetting clutch 203, at which time the spring 188 has exhausted its stored energy, the trailing cam 215 on shaft 216, which initially tensioned the spring 188, escapes from the cam face 214 of the U-shaped frame 177, whereupon the inferior spring 191, which has been tensioned by the advance of the connecting bar 187, asserts itself and returns the connecting bar 187, and clearing clutch control lever 194, to their normal positions. The clearing clutch control lever, therefore, releases the clutch disabling dog 200, 202 which returns to position to disconnect the clutch at the completion of a single rotation.

The connecting bar 187, on such return, draws with it the depending arm 185 of the bail 184 through the spring link connection 188, and the bail rocks the arm 181 and the U-shaped frame back to their initial raised positions.

The clearing clutch 203 rotates anti-clockwise and, through L, L₁, and L₃ (the pinion L₁ rotating in the direction of arrow x, Fig. 2) clears the corresponding orders of the totalizer. Before the clearing clutch 203 has completed the first half of its revolution, its pin 205, (Fig. 7), acts against the end 207 of the lever 209 from below to turn the lever clockwise about the screw 208. This movement is transmitted to the latch lever 170 through fork 212 and the sliding and rocking bail 177, to rock the latch lever clockwise. Its upper end 217, Figs. 8 and 9, acts against an incline on the catch 218a and forces the catch up. When the end of the latch lever 170 is in the position shown in dot-and-dash lines in Fig. 9, the catch 218a engages over the end 217 and the latch lever 170 is held against return in counter-clockwise direction.

When the corresponding orders of the result totalizer 3 have been cleared all functions required for storage have been performed, and the storage key 16 can now be released. The latch lever 170 when turning clockwise as described, releases the pin 168 of the storage key 16 which was in the notch 171, allowing springs 27 and 34 (Fig. 13) to return all parts connected to the key lever, to their initial positions. However, before the key lever 24 reaches its upper final, or initial position, it bears against the lug 220 and raises the catch 218a so that the latch lever 170 is released and the spring 174 pulls it against the pin 168 on the key lever 24, Fig. 8.

If the operator holds the storage key 16 depressed after the accumulation on the wheels of totalizer 3, has been completed, no calculations can be performed for the reasons stated in the last paragraph of section (5) entitled "The locking and coupling means for the storage key". On the other hand, the catch 218a allows the key lever 24 of the storage key 16, and the parts connected to it, to return into their initial positions immediately when the key 16 is released.

8. Mechanism for clearing the storage device

The bar 221 of the clearing key 17, Fig. 7, for the storage device is curved and has a slot 222 at its lower end by which it is guided on a headed screw 223. A spring 224 pulls the bar up in the direction of the arrow d in Fig. 17. The bar 221 has a laterally extending lug 225 with an angular tooth 226. The lower edge of the tooth bears against the pin 168 on the key lever 24 and its concave front edge 227 cooperates with the convex edge 169 of the latch lever 170.

Figure 17:
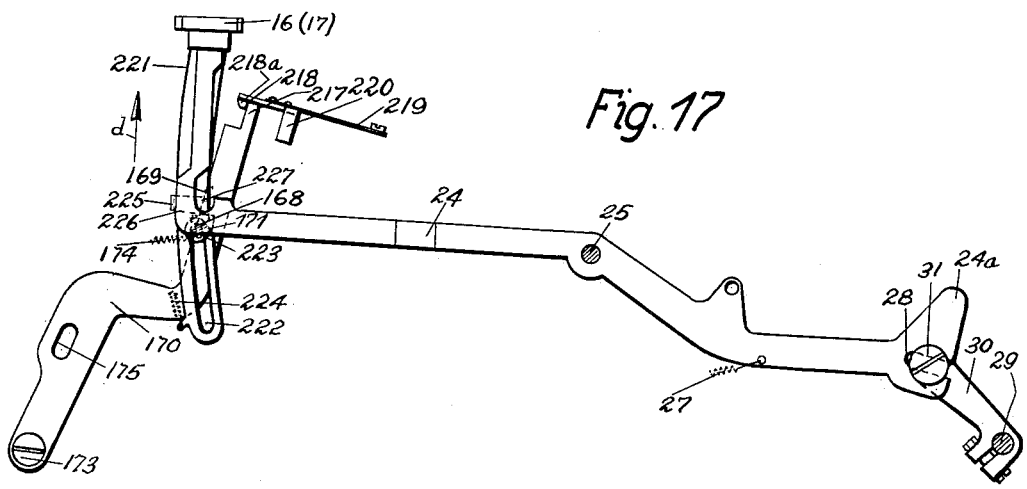
Fig. 17 is a view similar to Fig. 16 showing the storage key and the clearing key for the storage device in their depressed positions.

When the totalizer clearing key 17 is depressed, its tooth 226 rocks the key lever 24 of the storage key counter-clockwise through the pin 168. The length of the slot 222 is so determined that the final depressed position of the key 17 is also the active position of the storage key 16, as shown in Fig. 17. The mechanisms connected to the storage key 16 are now operated as described, and the storage device is cleared by transferring the stored values to the result totalizer 3. The totalizer 3 cannot be cleared by the means described in section (7) entitled "The coupling means for the clearing members of the result totalizer" as the latch lever 170, notwithstanding the juxtaposition of its notch 171 and the pin 168, cannot turn under the pull of the spring 174 because it is arrested by the concave edge 227 of the tooth 226 on the totalizer clearing key stem 221, which lies in the path of the convex edge 169 of the latch lever 170.

9. The operation of the machine

Assume that the products 11×11, 12×16, and 13×15 are to be added, and that the product 25×5 is to be subtracted from the total of the three products. The result totalizers 3 and the storage device 71 are in their zero positions.

The calculation keys 6 are depressed in the seventh and eighth rows from the left, Fig. 1, for introducing the multiplier "11," and the multiplicand is introduced in a similar manner in the first and second rows at the right of the calculation keys 6, the multiplication key 18 is depressed, and the first product 11×11=121 is indicated by the corresponding result totalizer 3, the revolution counter 4 indicating "11." The first product, "121," must now be transferred to the storage device 71 by depression of the storage key 16. Shaft 29 is turned clockwise and the parts 32, etc., are moved from their initial positions, Fig. 14, into the active positions, Fig. 15, as described. The end 50 of the lower arm 49 of the bellcrank 45, 49 is presented to the sector 52 on the tens transfer shaft 51, the pin disk 53 for the totalizer coupling D is disconnected from the transfer shaft 51 by the lever 61 shifting the sleeve 57 in the direction a, Fig. 13, and moving the cam plate 55 into active relation to the roller 108 at the upper end of the roller arm 107, Fig. 4. At the same time, the storage device 71 is moved into its active position, as shown in Fig. 15, so that its gears 75 mesh with the totalizer spur gears 76, Fig. 3, and, when the numeral wheels of the totalizer 3 are returned to zero, the first product "121" is transferred to the storage device 71 by the totalizer 3.

Upon depression of the storage key 16, the parts 109, etc., are moved from the position in Fig. 11 into that in Fig. 12, and the same occurs with the parts 153, etc., connected to the shaft 156, by which means the revolutions counter 4 is rendered inactive.

Lastly, the pin 168 on the key lever 24 of the storage key 16, through lever 170, shifts the U-frame 177 from the inactive, or initial, position, Fig. 8, into the active position Fig. 9, in which the curved cam 214 of the U-frame is presented to the cam 215 on the shaft 216, and the end of the lever 209 is presented to the pin 205 of the clearing clutch 203.

When the said preliminary adjustments following the depression of the storage key 16 have been completed, as described, the circuit of the motor 7a is closed by automatic means, not shown, and the main driving shaft 145 is rotated counter-clockwise. The actuating mechanism clutch 143 which has been released for operation by its lever 142, rotates with the main driving shaft and the tens transfer shaft 51 is rotated through the gearing which has been described. The first operation performed by the rotating tens transfer shaft is the clearing of the storage device 71 by the elevated portion of the cam plate 55 depressing the roller 108 on the arm 107 and, through the means described, shifting the rack 87, Fig. 4, to the right so that the clearing gears 90 are rotated counter-clockwise. However, as there is as yet no value in the storage gears 75, their zero gaps 80 are presented to the clearing gears 90 and they do not rotate the storage gears 75.

When the clearing operation in the storage device has been completed, that is, when the roller 108 is engaged by the low point of the cam plate 55, which occurs after about two thirds of a revolution of the tens transfer shaft 51, as described, the sector 52 rocks the lower arm 49 of the bellcrank, the upper arm of which moves the storage device 71 into inactive position by means of the crank 82. In the present instance, this disconnection of the storage device 75 and the totalizer spur gears 76 has no function. When the sector 52 releases the arm 49, the spring 44 returns the bellcrank 45, 49 into the position shown in Fig. 15 in which the storage device 71 is returned into active position and its gears 75 re-engaged with the totalizer spur gears 76. At this moment, the cam 215 on the shaft 216 engages the cam 214 of the U-frame 177 and tension is put on the spring 188, as described.

Shortly before the tens transfer shaft 51 has completed its revolution, the stay 136 of the tens transfer cams 135 engages the arm 137 of the lever 121 and turns the lever clockwise, so that, as described, the arm 134 of the lever 123 again leaves the abutment 133, and the spring 129b swings the levers 121, 123, and 126 until the lug 120 engages the step 119 in the catch 115, the parts occupying the intermediate positions illustrated in Fig. 12a. At the same time and under the action of the slot 138 in the lever 126, the clutch lever 142 returns into its initial position in which it throws out the actuating mechanism clutch 143 after one revolution, and releases the lever 194, to the action of the spring 188 to cause the lever 194 to trip the clearing clutch detent 200 and enable the clearing clutch 203 to engage with the main driving shaft 145.

Since the storage key 16 is still locked in its depressed position and holds the storage device 71 in active position, the storage gears 75 still are in mesh with the totalizer spur gears 76. The rod 206 which is connected to the clearing clutch 203 at 205, clears the totalizer 3 which contains the first product "121" through members $L_{h}$, $L$, and $L_{o}$ in the manner described, the storage gears 75 being rotated to register the amount entered into the totalizer, during the first half revolution of the clearing clutch 203. The totalizer shafts 74 are rotated clockwise until their tens transfer cams N, Fig. 2, engage the teeth Za of the tens transfer slides Z. Thus the storage device 71 receives the first product "121" while the corresponding result totalizer 3 is returned to zero. After value "121" has been transferred into the storage device 71 from the totalizer 3, the storage key 16 is unlocked by the pin 205 of the clearing clutch 203 engaging the end of the lever 209, and all parts operated by the storage key 16 return into their initial positions. The revolution counter 4, on which is registered factor "11" is cleared by depressing the key 13.

The second product, 12×16, is now entered by means of the keys 6, as described, and the multiplication key 18 is depressed whereupon the value "192" is indicated by the totalizer 3, and the value "16" by the revolution counter. To obtain the total "121+192," the storage key 16 is depressed again, but the product "192" is not transferred to the product "121" already in the storage device 71. Instead, the product "121" in the storage device 71 is added to the product "192" in the totalizer 3 by clearing the storage device 71 to transfer the amount registered thereon back onto the totalizer 3, and the total "313" thus obtained in the totalizer 3 is then transferred to the storage device 71, as follows.

When the storage key 16 is depressed, the storage device 71 is cleared in the manner described above, its clearing gears 90 rotating counter-clockwise. This, however, applies only to the three gears 75 at the right, as the value "121" was entered only in these by the first storage and so a solid tooth of each of the three gears is in line with the zero gaps 93 of the allotted clearing gears 90. These gears 75 are now rotated clockwise until their zero stops 78 engage the checks 79. By the rotation of the three gears 75 at the right, the three orders of the totalizer 3 at the right are rotated counter-clockwise through spur gears 76, in conformity with the stored value "121." However, since the totalizer 3 already indicates the value "192", the stored value "121" is added to "192", but only "213" is indicated by the totalizers, as the tens transfer has only been conditioned for the operation by the tens transfer cam N of the spur gear Na, Fig. 2, which engages the tooth Za of the tens transfer slide Z and shifts the slide in the direction of the arrow b. At this moment, the tens transfer shaft 51 has been rotated so far that its sector 52 acts on the end 50 of the bellcrank arm 49 and thereby disconnects the storage device 71 from the gears 76. This is, necessary preliminary to the tens transfer, as the storage gears 75 which are already at zero could not rotate clockwise as required for tens transfer, because already arrested by the checks 79. The tens transfer is effected immediately after the storage device has returned to its inactive position, Fig. 2, in manner per se known, by the tens transfer cams 135 on the tens transfer shaft 51 which elevate all tens transfer slides M. As, however, only the tens transfer slide Z of the tens place was shifted in the direction b, the corresponding tens transfer slide M is turned to the right when the slide Z rises, turning the numeral wheel of the 100 order of the totalizer one step so that the correct amount "313" is now indicated by the totalizer. After this has been effected, the sector 52 releases the arm 49, and the spring 44 returns the storage device into active position.

When the tens transfer shaft 51 has completed its revolution, the actuating mechanism clutch 143 is thrown out and the clearing clutch 203 is thrown in, so that the totalizer is now cleared. As the storage device is still in the active position, Fig. 3, the total of the two products 121+192=313, is transferred to the storage device 71. The third product 13×15=195 is now obtained and appears in the totalizer. For adding the value "313" in the storage device 71 to the value "195" in the totalizer, the storage key 16 is depressed again, the combined total of the first two multiplications, namely "313" is transferred from the storage device 71 to the totalizer 3 to be added to the result of the latest multiplication, namely, "195," after which the gross or final product "508" now registered on the totalizer is transferred onto the storage device and the totalizer is cleared, in the manner just explained, in the manner described. The value "508" is now in the storage device 71. The product of 25×5 must now be subtracted from the total "508." The finger lever 21, Fig. 1, is shifted to negative multiplication. The two factors 25×5 are now entered by means of the numeral keys in the manner described and the multiplication key 18 is depressed. The product now appears on the totalizer as the negative complement, "999 999 999 999 9875." To find the final result, 508—125=383, the clearing key 17 is depressed and thereby the value "508" in the storage device 71 is transferred additively to the value in the totalizer, and the machine now performs the following calculation:

```
    999 999 999 999 9875
  +000 000 000 000 0508
  ─────────────────────
    000 000 000 000 0383
```

The value "1" found at the left of the sixteenth place, by tens transfer, is not indicated since there is no numeral wheel at this point, and so the correct result "383" is indicated by the totalizer.

To clear the value "383" from the totalizer, the totalizer clearing key 12 is depressed, the clearing clutch 203 is thrown in and the value "383" is cleared from the totalizer through the mechanism L, L1, L3. The storage device and the totalizer are now at zero again.

We claim:

1. In a power-driven calculating machine, having a totalizer; and a storage device releasably engageable with the totalizer; the combination with an actuating shaft; a drive clutch releasably connectible with the actuating shaft; a clutch control element for the drive clutch; clearing mechanism for the totalizer; a releasable clutch connection between the totalizer clearing mechanism and the actuating shaft; clearing mechanism for the storage device; a storage control key to engage the storage device with the totalizer; means operable by the storage control key to shift the clutch control element and free the drive clutch for operation; means tripped by the drive shaft to return the actuating clutch control element to position to disconnect the drive clutch; means settable by the storage control key and operable by the actuating shaft to effect an operation of the storage device clearing mechanism; and a clutch control means for the totalizer clearing clutch; of tension means to operate the clutch control means for the totalizer clearing clutch to free said clutch for operation; means operable by the actuating shaft to store energy in the tension means; said tension means including a transmitting member normally out of the path of the actuating shaft-operated means; means operable by the storage control key to adjust said transmitting member into position to be actuated by the actuating shaft-operated means; and means controlled by the drive clutch control element to restrain the tension means against effective operation as long as the actuating clutch control element remains out of clutch disabling position.

2. In a power-driven calculating machine, the combination with a totalizer; a storage device; means to connect the storage device with the totalizer; means to clear the storage device to transfer an amount from the storage device onto the totalizer; clearing mechanism for the totalizer to transfer an amount from the totalizer to the storage device; and a storage device control key; of means under control of said storage device control key to automatically effect the operation of said clearing means for the storage device and the subsequent operation of said clearing means for the totalizer in timed relation, including a member shiftable under control of the storage device control key to enable the automatic operation of the totalizer clearing mechanism; a second key operatively connected with the storage device control key to depress the latter; and means controlled by said second key to restrain the shiftable member against operation, whereby the automatic clearing of the totalizer is eliminated.

3. In a calculating machine provided with a totalizer and a storage device, the combination with an actuating shaft; a drive clutch releasably connected with the actuating shaft; totalizer clearing means; a clutch to releasably connect the actuating shaft and totalizer clearing means; and a clearing means for the storage device; a storage device control key to engage the storage device and totalizer to enable the transfer of amounts from the totalizer to the storage device and vice versa; and means successively controlled by the storage device control key and by the actuating shaft to effect connection and subsequent disconnection of the drive clutch; of means successively controlled by the storage device control key, and by the actuating shaft prior to the disconnection of the drive clutch, and after the initial engagement of the storage device and the totalizer, to disengage and reengage the storage device and totalizer to enable a carry to be effected in the totalizer during the interval between such disengagement and re-engagement; and means settable by the storage device control key and tensioned by the actuating shaft for automatic operation subsequent to the re-engagement of the storage device and totalizer, and at a time substantially coincident with the disconnection of the drive clutch, to trip the totalizer clearing clutch to effect an immediately succeeding clearing operation of the totalizer, whereby to transfer to the storage device the accumulation from the totalizer while the storage device remains engaged with the totalizer.

4. In a calculating machine, the combination with a totalizer; an actuating shaft; a one-revolution drive clutch releasably connected with the actuating shaft; a storage device; a storage device control key to connect the storage device and totalizer; and means driven by the actuating shaft to transfer an amount from the storage device to the totalizer; of means also operable by the actuating shaft to disengage and then re-engage the storage device and the totalizer; means to transfer an amount from the totalizer to the storage device, including a totalizer clearing mechanism; a clutch between the totalizer clearing mechanism and the actuating shaft; operating means to trip the clearing mechanism clutch for operation, including an energy storing device, including means to tension the energy storing device; means intermediate the energy storing device and its tensioning means and shiftable into and out of operative position with relation to the tensioning means to determine whether energy shall be stored in the energy storing device; means operable by the storage device control key to shift said intermediate means into effective position; and means to prevent the actuation of the clearing clutch operating means by the energy storing means until a time substantially coincident with the completion of one revolution of the actuating shaft.

5. In a calculating machine, the combination with a totalizer; a storage device; an actuating shaft; and a drive clutch releasably connected with the actuating shaft; of a storage device control key; a yielding connection between the key and the storage device to enable the key, upon depression, to connect the storage device and the totalizer; a drive clutch detent; means controlled by the storage device control key to trip the drive clutch detent; means operable by the actuating shaft to automatically disconnect the storage device from the totalizer against the tension of the yielding connection, said yielding connection effective to re-connect the storage device and the totalizer; clearing mechanism for the totalizer; a clutch to connect the clearing mechanism and the actuating shaft; clearing clutch operating means; a normally relaxed spring connected with the clearing clutch operating means; means driven by the actuating shaft to tension the spring, including a transmitting member normally occupying an inoperative position relatively to the actuating shaft-driven means; means shiftable by the storage device key to position the transmitting member for operation by the actuating shaft-driven means; and means controlled by the actuating clutch detent to restrain the clearing clutch operating means against operation until the return of the detent to position to disconnect the drive clutch from the actuating shaft.

6. In a calculating machine, the combination with a totalizer; a storage device; an actuating shaft; a drive clutch operable by the actuating shaft; a clutch detent to normally hold the drive clutch open; and a storage device control key operable to effect connection of the storage device and totalizer, and to displace the clutch detent to enable the actuating shaft to drive the clutch; of clutch-operated means to effect without interruption the transfer of an amount from the storage device onto the totalizer, disengagement of the storage device from the totalizer to enable a carrying operation on the totalizer; re-engagement of the storage device with the totalizer, and transfer of the accumulated result from the totalizer to the storage register, upon a single depression of the storage device control key, including totalizer clearing mechanism; a clearing clutch between the totalizer clearing mechanism and the actuating shaft; a normally effective clearing clutch detent; normally idle tensioning means to shift the clearing clutch detent to ineffective position; means driven from the drive clutch to store energy in the tensioning means; locking means controlled by the actuating clutch detent to prevent operation of the clearing clutch detent under the influence of the tensioning means; and means controlled by the drive clutch to restore the drive clutch detent to effective position and displace the locking means controlling operation of the clearing clutch detent, to free the clearing clutch detent to the action of the tensioning means after re-engagement of the storage device with the totalizer.

7. In a calculating machine, the combination with a totalizer; a storage device; an actuating shaft; a drive clutch operable by the actuating shaft; a clutch detent to normally hold the drive clutch open; and a storage device control key operable to effect connection of the storage device and totalizer, and to displace the clutch detent to enable the actuating shaft to drive the drive clutch; of clutch operated means to effect without interruption the transfer of an amount from the storage device onto the totalizer, disengagement of the storage device from the totalizer to enable a carrying operation on the totalizer; re-engagement of the storage device with the totalizer, and transfer of the accumulated result from the totalizer to the storage register, upon a single depression of the storage device control key, including totalizer clearing mechanism; a clearing clutch between the totalizer clearing mechanism and the actuating shaft; a normally effective clearing clutch detent; normally idle tensioning means to shift the clearing clutch detent to ineffective position; means driven from the drive clutch to store energy in the tensioning means, said tensioning means including a transmitting member shiftable into and out of operative relation with the means driven from the drive clutch for storing energy in the tensioning means; means operable by the storage device control key to shift the transmitting member into operative relation with the means driven from the drive clutch for storing energy in the tensioning device, and also effective to lock the storage device control key in operated position; locking means controlled by the drive clutch detent to prevent operation of the clearing clutch detent under the influence of the tensioning means; means controlled by the drive clutch to restore the drive clutch detent to effective position and displace the locking means controlling operation of the clearing clutch detent, to free the clearing clutch detent to the action of the tensioning means after re-engagement of the storage device with the totalizer; and means operable by the totalizer clearing clutch to return the transmitting member to its normal ineffective position and to release the storage device control key.

8. In a calculating machine, the combination with a totalizer; a storage device; an actuating shaft; a drive clutch operable by the actuating shaft; a normally effective clutch detent for the drive clutch; and a storage device control key operable to effect engagement of the storage device and the totalizer; of drive clutch operated means to uninterruptedly effect the transfer of an amount from the storage device to the totalizer, the disengagement of the storage device from the totalizer to enable a carrying operation in the totalizer, the re-engagement of the storage device with the totalizer, and the transfer of the accumulated amount from the totalizer to the storage device, all initiated by a single depression of the storage device control key, including means to latch the storage device control key in its operated position; a spring link connection between the storage device control key and the storage device, to enable the disengagement of the storage device from the totalizer while the storage device control key remains depressed, such disengagement tensioning the spring link to effect re-engagement of the storage device and totalizer; totalizer clearing mechanism; a clutch to connect the totalizer clearing mechanism with the actuating shaft; a normally effective clutch detent for the totalizer clearing clutch; means controlled by the drive clutch detent to hold the clearing clutch detent against operation while the drive clutch is effective; a normally relaxed tension means; and drive clutch operated means to store energy in the tension means to automatically displace the clearing clutch detent substantially simultaneously with the return of the drive clutch detent to position to disconnect the drive clutch.

9. In a calculating machine having a totalizer, and a storage device releasably engageable with the totalizer; the combination with an actuating shaft; a drive clutch releasably connected to the actuating shaft; a clutch control element for the drive clutch; clearing mechanism for the totalizer; a releasable clutch connection between the totalizer clearing means and the actuating shaft; a storage device control key to connect the storage device with the totalizer; means operable by the storage device control key to shift the drive clutch control element to render the clutch effective; and drive clutch operated means to set the drive clutch control element to position to disconnect the drive clutch from the actuating shaft at the end of one cycle; of a clutch detent to control the totalizer clearing clutch; said clutch detent being normally restrained in clutch-disabling position by the clutch control element for the drive clutch, while the drive clutch is effective; tensioning means to shift the clearing clutch control to free the clearing clutch for operation, including a transmitting member settable by the storage device control key; and means operable by the drive clutch to tension the tensioning means to shift the clearing clutch control means, and to free the clearing clutch for operation as soon as the drive clutch control element releases the clearing clutch control element.

10. In a calculating machine having a totalizer, and a storage device releasably engageable with the totalizer; the combination with an actuating shaft; a drive clutch releasably engageable with the actuating shaft; a clutch control element for the drive clutch; clearing mechanism for the totalizer; a releasable clutch connection between the totalizer clearing means and the actuating shaft; a storage device control key to connect the storage device with the totalizer; means operable by the storage device control key to shift the drive clutch control element to enable clutch connection of the drive clutch with the actuating shaft; and means operable from the drive clutch to set the drive clutch control element to position to disconnect the drive clutch from the actuating shaft at the end of one cycle; of a clutch detent to control the totalizer clearing clutch; said clutch detent being normally restrained in clutch-disabling position by the drive clutch control element, while the drive clutch is effective; a normally relaxed tensioning means to shift the clearing clutch control means to free the clearing clutch for operation; means operable by the drive clutch to store energy in the tensioning means; and a spring pressed latch for the storage control key latch effective upon depression of the storage device control key to place the tensioning means in position to be actuated by the last-named drive clutch operated means.

11. In a calculating machine having a totalizer, and a storage device releasably engageable with the totalizer; the combination with an actuating shaft; a drive clutch releasably engageable with the actuating shaft; a clutch control element for the drive clutch; clearing mechanism for the totalizer; a releasable clutch connection between the totalizer clearing means and the actuating shaft; a storage device control key to connect the storage device with the totalizer; means operable by the storage device control key to shift the clutch control element to enable connection of the drive clutch with the actuating shaft; and means operable from the drive clutch to set the clutch control element to position to disconnect the drive clutch from the actuating shaft at the end of one cycle; of a clutch detent to control the totalizer clearing clutch; said clutch detent being normally restrained in clutch-disabling position by the clutch control element for the drive clutch, while the drive clutch is effective; tensioning means to shift the clearing clutch detent to free the clearing clutch for operation; normally ineffective drive clutch-operated means to store energy in the tensioning means; means settable by the storage device control key to shift the tensioning means to position to be actuated by the drive clutch-operated means, and co-acting with the storage control key to latch the storage control key in its operated position and the tensioning means in its set position; and means operable by the clearing clutch to restore the settable means and release the storage device control key from its latch for return to its normal position.

12. In a calculating machine having a totalizer, and a storage device releasably engageable with the totalizer; the combination with an actuating shaft; a drive clutch releasably engageable with the actuating shaft; a clutch control element for the drive clutch; clearing mechanism for the totalizer; a releasable clutch connection between the totalizer clearing means and the actuating shaft; a storage device control key to connect the storage device with the totalizer; means operable by the storage device control key to shift the clutch control element to enable clutch connection of the drive clutch with the actuating shaft; and means operable from the drive clutch to set the clutch control element to position to disconnect the drive clutch from the actuating shaft at the end of one cycle; of a clutch detent to control the totalizer clearing clutch, said clutch detent being normally restrained in clutch-disabling position by the drive clutch control element, while the drive clutch is effective; tensioning means settable by the storage device control key, and rendered effective by the actuating shaft, to shift the clearing clutch detent and free the clearing clutch for operation, upon the release of the clearing clutch control means by the drive clutch control element; clearing means for the storage wheels; means settable by the storage device control key, and actuated by the actuating shaft, to operate the storage device clearing means; and a manually operable member to depress the storage device control key while restraining the settable tensioning means against movement to effective position, to initiate a clearing operation of the storage device.

13. In a power-driven calculating machine, the combination with an actuating shaft, a totalizer, a totalizer clearing means, a normally idle clutch connection between the totalizer clearing means and the actuating shaft; a storage device shiftable into and out of connection with the totalizer; a storage device control key to connect the storage device with the totalizer to initiate the transfer of an amount from the storage device onto the totalizer; means operable by the actuating shaft subsequently to the engagement of the storage device and totalizer to transfer an amount from the storage device onto the totalizer; means operable by the actuating shaft to disconnect the storage device and totalizer; and means to initiate a carrying operation on the totalizer during the time of disengagement of the storage device and the totalizer; of means conditioned by the storage device control key incident to initiating the transfer of an amount from the storage device to be added to an amount registered on the totalizer, and operable from the actuating shaft, to automatically re-engage the storage device and totalizer; and means automatically operable, under control of the actuating shaft, in timed relation with the reengagement of the storage device and totalizer, to release the totalizer clearing means for operation to effect the transfer of the added amounts from the totalizer onto the storage device to clear the totalizer for the reception of further amounts, while preserving intact the amount last transferred onto the storage device.

ROBERT ANSCHÜTZ.
RICHARD GRÖSCHEL.